US009238274B2

(12) United States Patent
Cole et al.

(10) Patent No.: US 9,238,274 B2
(45) Date of Patent: Jan. 19, 2016

(54) SYSTEM AND METHOD FOR HOT WIRE TIG POSITIONED HEAT CONTROL

(71) Applicant: Lincoln Global, Inc., City of Industry, CA (US)

(72) Inventors: Stephen R. Cole, Chula Vista, CA (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 168 days.

(21) Appl. No.: 13/960,865

(22) Filed: Aug. 7, 2013

(65) Prior Publication Data

US 2014/0374391 A1 Dec. 25, 2014

Related U.S. Application Data

(60) Provisional application No. 61/838,028, filed on Jun. 21, 2013.

(51) Int. Cl.
*B23K 10/02* (2006.01)
*B23K 9/095* (2006.01)
(Continued)

(52) U.S. Cl.
CPC ............. *B23K 9/0956* (2013.01); *B23K 9/0216* (2013.01); *B23K 9/0286* (2013.01); *B23K 9/124* (2013.01); *B23K 9/167* (2013.01); *B23K 10/02* (2013.01); *B23K 26/20* (2013.01); *B23K 37/0217* (2013.01); *B23K 37/0282* (2013.01)

(58) Field of Classification Search
CPC ........ B23K 10/02; B23K 9/02; B23K 9/0956; B23K 9/167; B23K 37/0217; B23K 37/0282

USPC ............... 219/124.34, 137 R, 124.1, 121.45, 219/125.12, 130.31
See application file for complete search history.

(56) References Cited

U.S. PATENT DOCUMENTS 4,242,620 A * 12/1980 Fujiwara et al. .............. 318/576
4,249,062 A 2/1981 Hozumi et al.
(Continued)

FOREIGN PATENT DOCUMENTS

| JP | 55024759 | 2/1980 |
|----|----------|--------|
| JP | 56119673 | 9/1981 |

(Continued)

OTHER PUBLICATIONS

PCT/IB2014/001134—International Search Report and Written Opinion of the International Searching Authority mailed Nov. 27, 2014.

*Primary Examiner* — Mark Paschall
(74) *Attorney, Agent, or Firm* — Hahn Loeser & Parks LLP; Carlos P. Garritano

(57) ABSTRACT

The invention described herein generally pertains to a system and method related to energizing a welding wire based on a location of an electrode at an edge on a workpiece. An edge detector can be configured to identify an edge on the workpiece during a welding operation and a controller can be configured to mange a temperature of a puddle formed by the electrode by adjusting one or more welding parameters. The welding parameters can be, but are not limited to, an energizing of the welding wire, a wire feed speed, a temperature of a high intensity heat source (e.g., arc, a sub arc, a tungsten inert gas (TIG) arc, a metal inert gas (MIG) arc, a laser, a plasma arc, a metal core, or a flux core), movement speed, among others.

13 Claims, 7 Drawing Sheets

(51) Int. Cl.
*B23K 26/20* (2014.01)
*B23K 9/02* (2006.01)
*B23K 9/028* (2006.01)
*B23K 9/12* (2006.01)
*B23K 9/167* (2006.01)
*B23K 37/02* (2006.01)

(56) References Cited

U.S. PATENT DOCUMENTS

| | | | |
|---|---|---|---|
| 4,544,825 A | 10/1985 | Cook | |
| 4,631,385 A | 12/1986 | Rothermel | |
| 4,761,596 A | 8/1988 | Nio et al. | |
| 4,879,445 A | 11/1989 | Kawano et al. | |
| 5,166,495 A * | 11/1992 | Ekelof et al. | 219/124.34 |
| 6,155,117 A | 12/2000 | Stevens et al. | |
| 6,977,357 B2 | 12/2005 | Hsu et al. | |
| 7,919,728 B2 | 4/2011 | Era et al. | |
| 8,063,340 B2 * | 11/2011 | Hu et al. | 219/137 R |

FOREIGN PATENT DOCUMENTS

| | | |
|---|---|---|
| JP | 59107773 | 6/1984 |
| JP | 62089576 | 4/1987 |
| JP | 2005111551 | 4/2005 |

\* cited by examiner

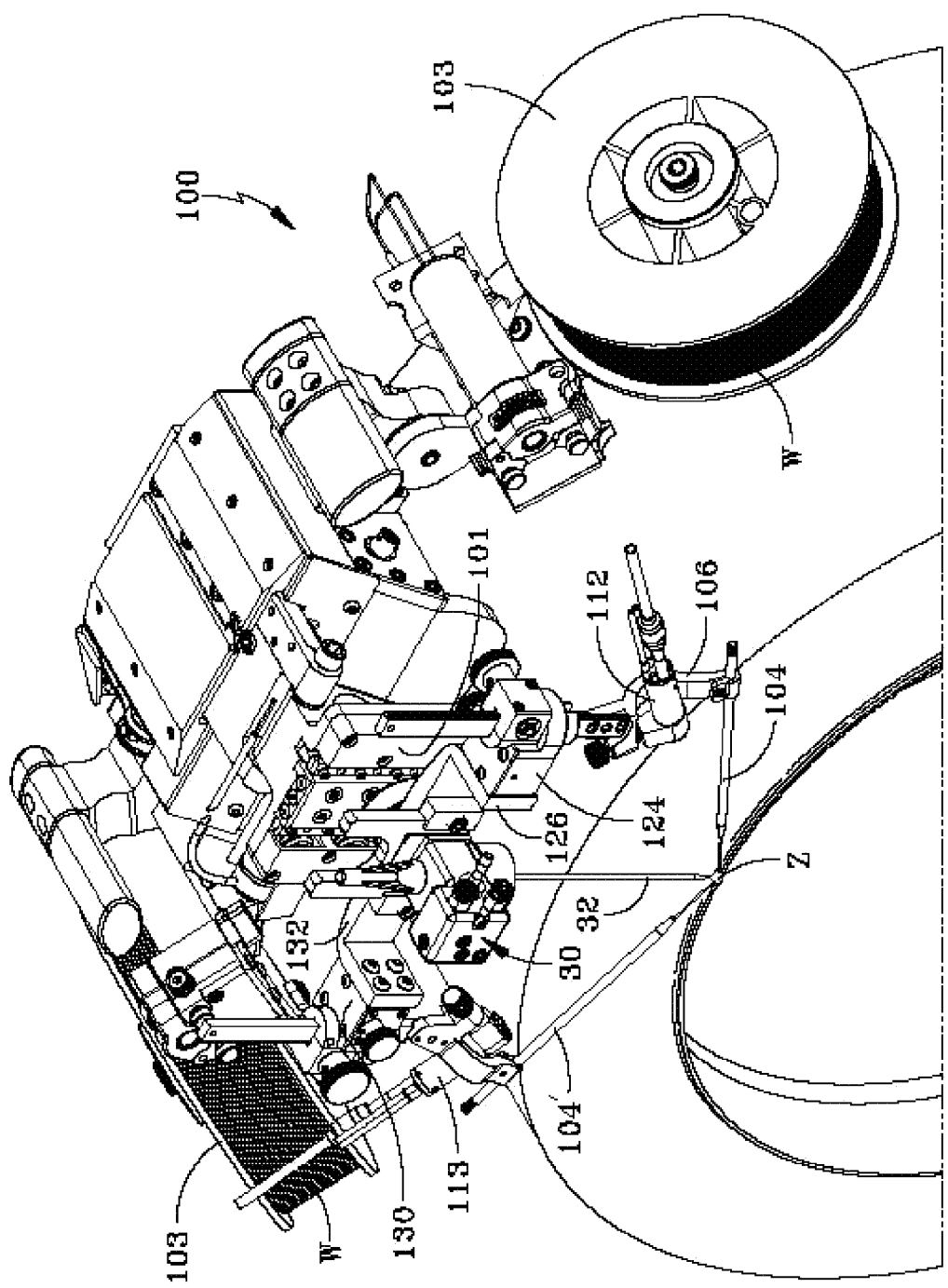

SYSTEM AND METHOD FOR HOT WIRE TIG POSITIONED HEAT CONTROL

PRIORITY

This application claims the benefit of priority to U.S. Provisional Application Ser. No. 61/838,028, filed Jun. 21, 2013, and entitled "SYSTEM AND METHOD FOR HOT WIRE TIG POSITIONED HEAT CONTROL." The entirety of the aforementioned application is incorporated herein by reference.

TECHNICAL FIELD

In general, the present invention relates to an orbital welding system or a non-orbital welding system. More particularly, the present invention relates to a energizing a welding wire based on a detection of an edge on a workpiece during a welding operation.

BACKGROUND OF THE INVENTION

Welding systems reside at the core of the modern industrial age. From massive automobile assembly operations to automated manufacturing environments, these systems facilitate joining in ever more complicated manufacturing operations. Hot wire welding processes a wire or electrode being heated (e.g., via current) and received by a puddle created by a main heat source (e.g., plasma arc, tungsten inert gas (TIG) welding, metal inert gas (MIG) welding, flux core, laser, among others). The hot wire welding process includes the resistance heating of the up to or near a melting point of such wire. In hot wire welding processes, the formation of an arc is avoided since an arc condition disrupts or overheats the puddle. A wire heated near or close to the melting point of the wire without arcing events is received by the puddle with little or no disruption. In order to prevent a formation of an arc, a welding parameter related to the workpiece can be detected. The welding parameter can indicate an arc condition in which the hot wire welding process can be adjusted.

Additionally, welding may involve, raising, cladding, building up, filling, hard facing, overlaying, joining, and other welding applications. When confronted with a workpiece having a curved surface, an orbital welding processes may be used to rotate the welding head to apply a weld to the curved surface. The most common examples, where orbital welding is used, is the welding of pipe. Pipe welding may include thin wall application where the welding head is rotated about the other surface two piece ends being joined together, alternatively, pipe welding may include deep grove geometries where the welding electrode extends into a grove formed between the two pipes being joined to lay down successive beads of weld material to fill the grove the join the thick walled pipes. Orbital welding systems may include a welding head that is mounted on a guide track or a fixture that clamps or is otherwise supported on the workpiece and rotated to supply a weld. With orbital welding often involves limited visibility of a welding zone with lead cameras and/or trailing cameras.

Fusion into a sidewall of a joint or a more narrow "V" groove can lead to pockets of a lack of material (e.g., weld deposit) that should be existent therein. These pockets require repair by grounding out or being re-welded. In either of orbital welding systems or non-orbital welding systems, lack of fusion, among other welding defects, requires repair which can add costs to a welding job as well as an increase in time for welding job completion. Lack of fusion can be defined as the poor adhesion of a weld bead to a base metal and incomplete penetration is a weld bead that does not start at a root of a weld groove. Further, welding techniques are attempting to minimize the total amount of welding by decreasing a width of a joint (e.g., more narrow "V" groove) which translates into a steeper sidewall. A steeper sidewall is harder to penetrate into during a welding operation.

Orbital welding systems and non-orbital welding systems can be compromised by groove geometries and/or steeper sidewalls with a workpiece and what is needed is an improved technique to related to preventing lack of fusion during a welding operation.

SUMMARY OF THE INVENTION

In accordance with an embodiment of the present invention, a welder system is provided that includes a welding torch that includes an electrode. The system can further include a power source that creates a high intensity heat source between the electrode and a workpiece to create a puddle and a wire feeder that is connected to a supply of welding wire to provide a welding wire to puddle formed by the electrode. The system further includes an edge detector that is configured to identify an edge on the workpiece and a welding wire power source that energizes the welding wire. The system further includes a controller that controls the welding wire power source based on the edge identified.

In accordance with an embodiment of the present invention, a method is provided that includes at least the following steps: creating a high intensity heat source between an electrode and a workpiece; delivering a welding wire to a puddle formed by the electrode; identifying an edge in a groove of the workpiece; and energizing the welding wire with a current based on the edge identified.

In accordance with an embodiment of the present invention, a welder system is provided that includes at least the following: a welding torch that includes an electrode; a power source that creates a high intensity heat source between the electrode and a workpiece to create a puddle; means for supplying of welding wire to provide a welding wire to puddle formed by the electrode; means for identifying an edge on the workpiece; and means for energizing the welding wire based on the edge identified.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 2B illustrates a perspective view of an orbital welding system;

DETAILED DESCRIPTION OF THE INVENTION

Embodiments of the invention relate to methods and systems that relate to energizing a welding wire based on a location of an electrode at an edge on a workpiece. An edge detector can be configured to identify an edge on the workpiece during a welding operation and a controller can be configured to mange a temperature of a puddle formed by the electrode by adjusting one or more welding parameters. The welding parameters can be, but are not limited to, an energizing of the welding wire, a wire feed speed, a temperature of a high intensity heat source (e.g., arc, a sub arc, a tungsten inert gas (TIG) arc, a metal inert gas (MIG) arc, a laser, a plasma arc, a metal core, or a flux core), movement speed, among others.

"Welding" or "weld" as used herein including any other formatives of these words will refer to depositing of molten material through the operation of an electric arc including but not limited to submerged arc, GMAW, MAG, MIG, TIG welding, or any electric arc used with an orbital welding system. "Electrode" as used herein describes a conventional electrode, consumable electrode, non-consumable electrode for various arc processes as well as optics to deliver and focus (or defocus) a laser beam light source for the purpose of forming a puddle on a workpiece.

Figure 1:
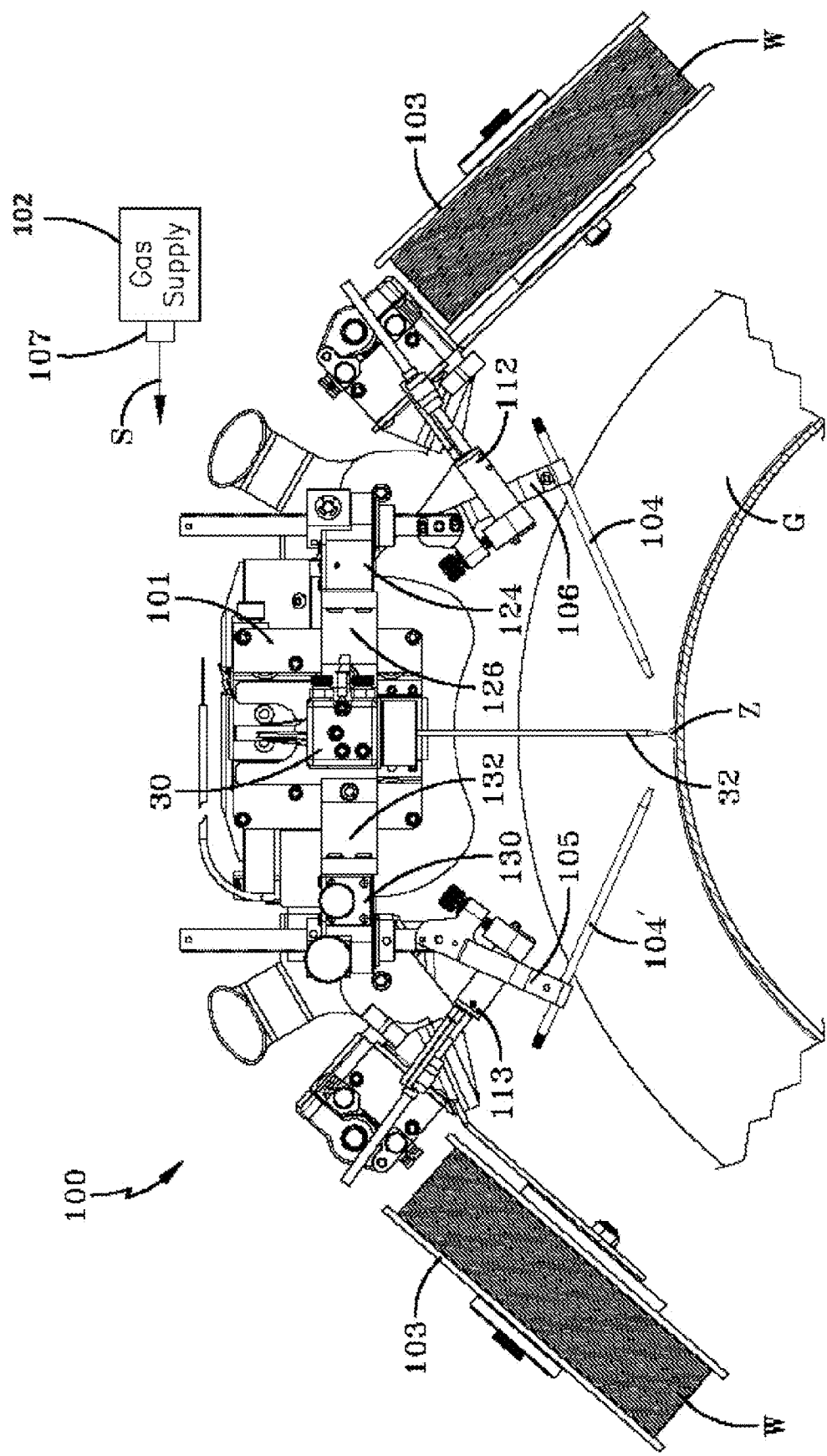
FIG. 1 illustrates a front view of an orbital welding system.
Figure 2A:
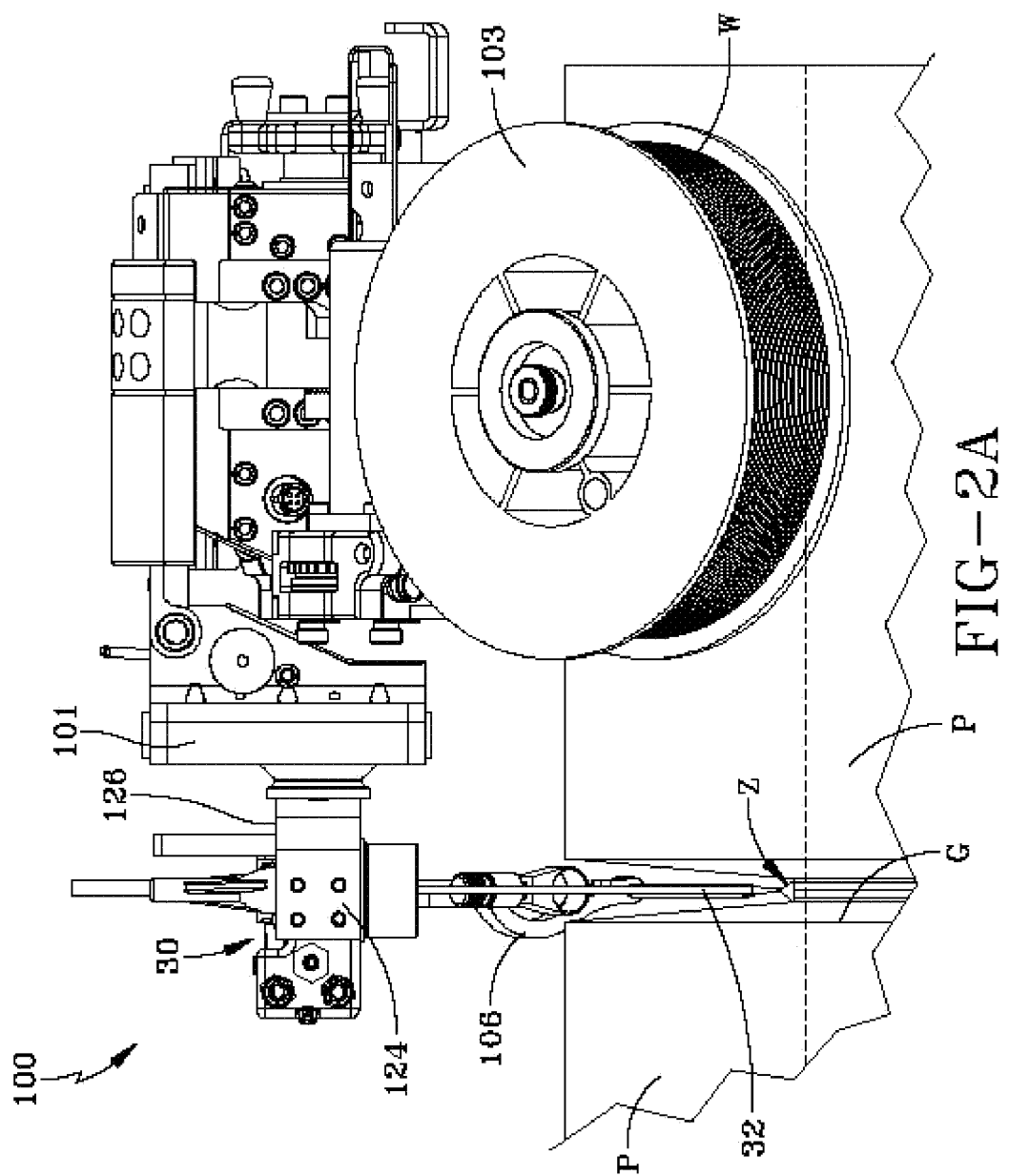
FIG. 2A illustrates a side view of an orbital welding system.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-6 illustrates a welding system that is used with an automated or semi-automated welding system. One illustrative example of a welding system is orbital welding, which is often used for the joining of tubes or pipes of various types of materials. For example, a Tungsten Inert Gas (TIG) or Gas Tungsten Arc Welding (GTAW) welding torch may be used to orbit around the pipes to be welded together by an automated mechanical system. FIGS. 1-2B illustrates an example embodiment of orbital welding system 100 (also referred to as welder, system, welding system, and/or welder system) as used in an orbital welding environment. Orbital welding system 100 includes a welding tractor that travels around the pipes or tubes, a welding power source and controller, and a pendant providing operator control. It is to be appreciated that the subject innovation can be used with any orbital or non-orbital welding system. Moreover, the subject innovation can be used with any welding operation that includes an arc and a hot wire that is liquefied to deposit welding material onto a workpiece.

System 100 (as seen in FIGS. 1-2B) is generally used in deep groove welding. In the example shown, welding system 100 includes an orbital TIG welder having a welder body or chassis 101, which may be attached to the work piece or supported on a track. Welder 100 includes a welding torch, generally indicated at 30, having a welding electrode 32 for depositing weld material to form a weld joint at welding zone Z. Electrode 32 is an extended electrode having an electrode length suitable for the groove G being welded. Extended electrode 32 may have any length suitable for a given deep groove weld, including lengths greater than 10 millimeters. As depicted in the example shown, electrode length may be greater than 100 millimeters. The particular example shown has a length of about 120 millimeters. This example is not limiting as electrodes having greater or lesser lengths may be used depending on the depth of the groove G.

Welding torch 30 is connected to a shield gas supply 102, that provides an inert gas, such as Argon gas, to welding torch 30. Welding gas supply 102 may include a container, such as a cylinder, that stores shield gas S under pressure, and delivery of shield gas S, via appropriate tubing or other conduits, may be controlled by a regulator or other controller 107. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welder may include a wire feeder connected to a supply of welding wire, such as a spool 103 that provides tungsten wire W to one or more wire guides 104', 104. In the example shown, a pair of extended wire guides 104', 104 are provided and fed by independent spools 103 located on either side of chassis 101. The extended wire guides 104', 104 are supported on first camera device and wire guide system 105 (also referred to as first mount system 105) and second camera device and wire guide system 106 (also referred to as second mount system 106) respectively that are each laterally outward of electrode 32 and above the workpiece or pipe P. It is to be appreciated that the support for the extended wire guides 104', 104 can be chosen with sound engineering judgment without departing from the intended scope of coverage of the embodiments of the subject invention.

The wire guides 104', 104 can include position device (e.g., discussed below in FIG. 4) that provides automated or semi-automated motion, wherein the motion can be in any direction within a 3-dimensional environment in proximity to an arc created within welding zone Z. For instance, the wire guides 104', 104 can extend inward and downward toward electrode 32 and welding zone Z. The example welder is supported on a track and drive by a tractor drive around pipe (also referred to as workpiece W) with wire guides 104', 104 being located in lead and lag positions relative to welding electrode 32. In an embodiment, first mount system 105 is coupled to height adjustment device 130 that allows adjustment of first mount system 105 toward welding zone Z or away welding zone Z. It is to be appreciated that the adjustment toward welding zone Z or away welding zone Z can be automated or semi-automated. Further, the adjustment can be to a side of the welding zone Z or to an opposite side of the welding zone Z (e.g., a left motion, a right motion, etc.). Height adjustment device 130 is further coupled to support member 132 that is coupled to a portion of chassis 101 of welder system 100. Similarly, second mount system 106 is coupled to height adjustment device 124 that allows adjustment of second mount system 106 toward welding zone Z or away welding zone Z. It is to be appreciated that the adjustment toward welding zone Z or away welding zone Z can be automated or semi-automated. Further, the adjustment can be to a side of the welding zone Z or to an opposite side of the welding zone Z (e.g., a left motion, a right motion, etc.). Height adjustment device 124 is further coupled to support member 126 that is coupled to a portion of chassis 101 of welder system 100.

First mount system 105 supports camera device 113 and wire guide 104', wherein both camera device 113 and wire guide 104' are positioned to aim on or toward welding zone Z. Similarly, second mount system 106 supports camera device 112 and wire guide 104, wherein both camera device 112 and wire guide 104 are positioned to aim on or toward welding zone Z. It is to be appreciated that system 100 includes camera device 112 and camera device 113 but such devices are solely illustrating various embodiments and is not to be considered limiting on the subject innovation. It is to be appreciated that camera device 113 and wire guide 104' move together (or independently) with welder system 100 which enables supply of welding wire consistently at welding zone Z and/or where wire is feed from wire guide 104'. It is to be appreciated camera device 112 and wire guide 104 together (or independently) with welder system 100 which enables supply of welding wire consistently at welding zone Z and/or where wire is fed from wire guide 104' and ultimately from wire feeder (wire supply or spool 103).

Figure 3A:
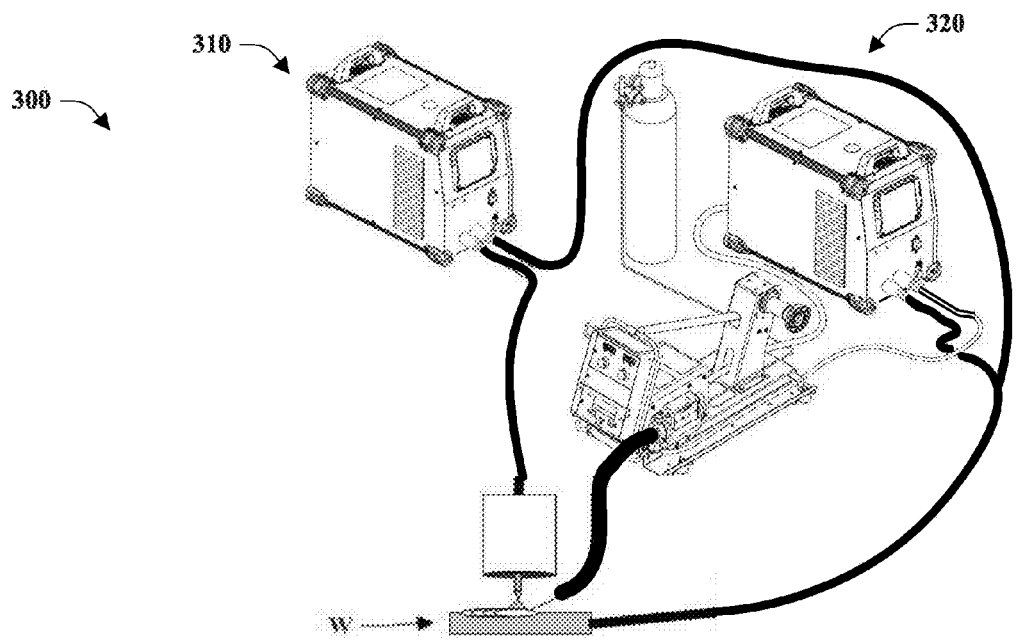
FIG. 3A is a diagram illustrating portion of a hot wire welding system.
Figure 3B:
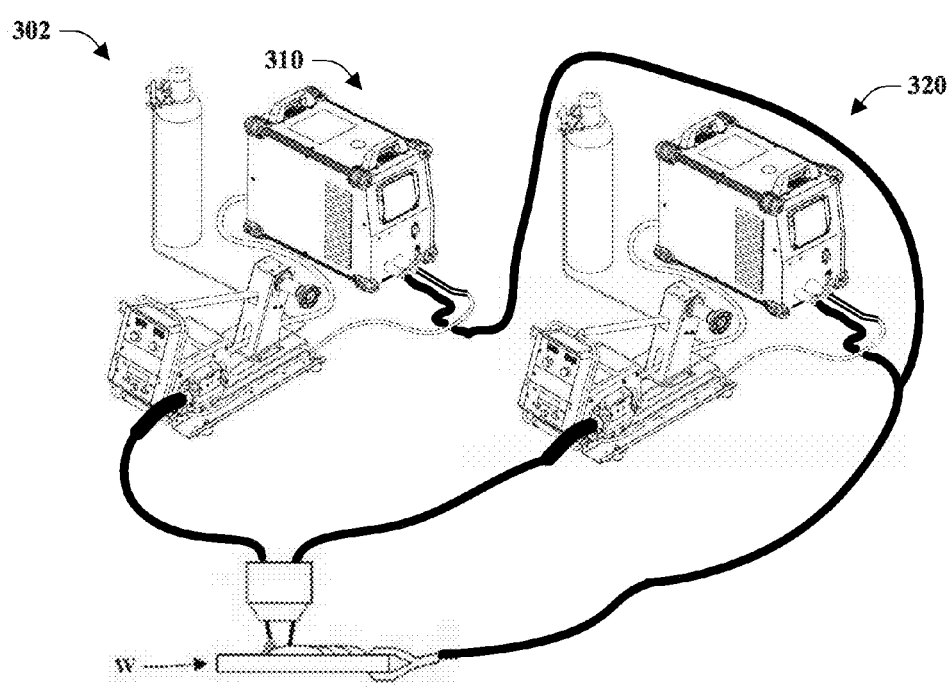
FIG. 3B is a diagram illustrating portion of a hot wire welding system.

FIGS. 3A and 3B illustrate diagrams of a hot wire welding system 300 and a hot wire welding system 302 in accordance with the subject innovation. As discussed above, it is to be appreciated and understood that any suitable hot wire welder system can be implemented with the subject innovation and such systems in FIGS. 1-3B are not to be limiting on the scope of the subject claims. System 300 includes a first power supply 310 that provides a first heat source to create an arc between an electrode (e.g., a non-consumable electrode for instance) and a workpiece W, wherein a puddle is created by the electrode. System 300 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W. It is to be appreciated that welding systems 100 and 300 can be chosen and used with sound engineering judgment without departing from the intended scope of coverage of the embodiments of the subject invention.

System 302 includes a first power supply 310 that provides a first heat source to create an arc between an electrode (e.g., a non-consumable electrode for instance) and a workpiece W, wherein a puddle is created by the electrode. System 300 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W. It is to be appreciated that welding systems 100 and 300 can be chosen and used with sound engineering judgment without departing from the intended scope of coverage of the embodiments of the subject invention.

It is to be appreciated that systems 300 and 302 can be a hot wire TIG welder system or a hot wire tandem welder system. The subject innovation can relate to an arc that is created by any suitable wire processes, wherein such wire processes can include non-consumable electrode processes.

Figure 4:
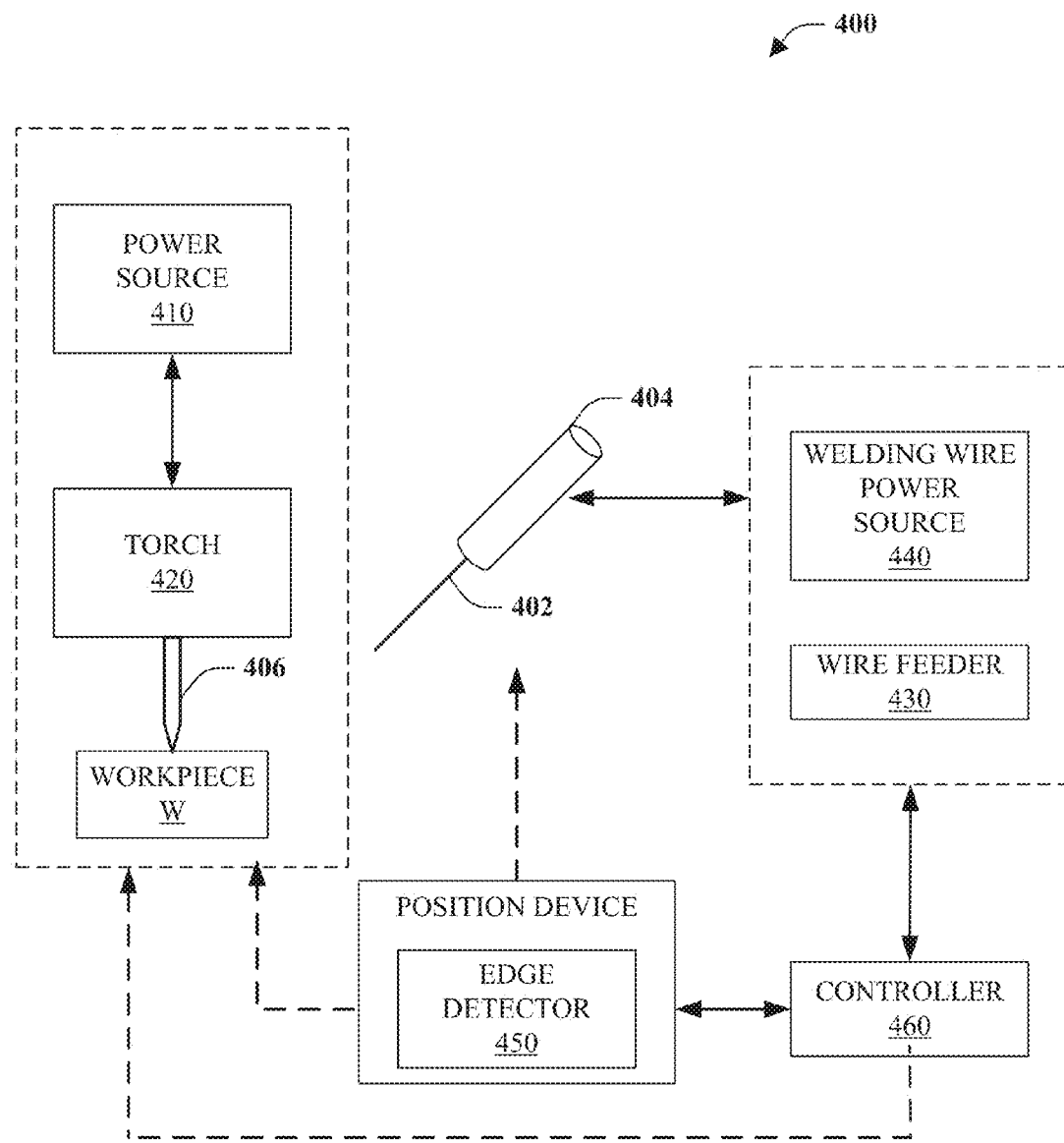
FIG. 4 is a diagram illustrating a welder system that adjusts an energizing of a welding wire based on detection of an edge on a workpiece.

FIG. 4 illustrates welder system 400 that adjusts an energizing of a welding wire based on detection of an edge on a workpiece. System 400 includes wire guide 404 that directs welding wire 402 to a welding zone that includes an arc that is generated between electrode 406 and workpiece W. It is to be appreciated that wire guide 404 can be any suitable member that delivers welding wire 402 from wire feeder 430 to the welding zone and ultimately to a puddle formed by electrode 406. Torch 420 in system 400 includes electrode 406 in which power source 410 creates the arc between electrode 406 and workpiece W. It is to be appreciated that arc 406 can be any suitable high intensity heat source such as, but not limited to, an arc, a sub arc, a tungsten inert gas (TIG) arc, a metal inert gas (MIG) arc, a laser, a plasma arc, a metal core, or a flux core.

System 400 can include welding wire power source 440 that can energize welding wire 402, wherein the energizing of welding wire 402 is either activated or de-activated based on an identification of an edge. For instance, an edge can be in a "V" shaped groove or any other variation of a groove on workpiece W. In another embodiment, an edge includes at least one or more sidewalls located on workpiece W at which a welding material is deposited. In other words, an edge can be included on workpiece W that is less than 90 degree sidewall. In an example, a "V" shape can be present in that the each sidewall forms a portion of the "V." For example, welding wire power source 440 can generate a waveform to energize welding wire 402. In an embodiment, the edge can be associated with any suitable shape on workpiece W and one of sound engineering judgment can apply various shapes of edges to be used with the subject innovation without departing from the intended scope of coverage of the embodiments of the subject invention.

System 400 can further include position device 470 that provides movement to at least one of wire guide 404, welding wire 402, workpiece W, torch 420, electrode 406, or a combination thereof. Position device 470 can provide movement in any direction around the arc, toward the arc, among others. By way of example and not limitation, position device 470 can provide an oscillating movement, a motion to a side of the arc, a motion to an opposite site of the arc, a motion toward the arc, a motion away from the arc, a motion above the arc, a motion below the arc, or a combination thereof. For instance, position device 470 can provide movement for a weaving welding motion that enables welding from side-to-side while progressing in a direction of travel to create a weld. In an embodiment, torch 420 includes position device 470 that maneuvers about workpiece W. In another embodiment, position device 470 can change the location of the workpiece in relation to electrode 406. In still another embodiment, position device 470 can be a welder seamer. Still, position device 470 and various configurations thereof can be chosen and used with sound engineering judgment without departing from the intended scope of coverage of the embodiments of the subject invention.

System 400 can include edge detector 450 that is configured to identify an edge on workpiece W. As discussed above, an edge can be any sidewall that is less than 90 degrees in a joint that a weld material is to be deposit by welder system 400. Edge detector 450 can be automated and/or semi-automated in identifying an edge. Moreover, edge detector 450 can be configured to detect a non-edge on workpiece W. For instance, during a weld weave operation, torch 420 has a side-to-side motion while traveling with a joint that is to be filled with welding material. Form a cross-view of this side-to-side motion, welder system 400 encounters a left sidewall of the "V" shaped groove and also a right sidewall of the "V"

shaped groove. In between the left sidewall and the right sidewall is referred to as a non-edge. It follows that the left sidewall is referred to as an edge and the right sidewall is referred to as an edge. In an embodiment, a "V" shaped groove can include two edges. In another embodiment, a groove can include one edge. For instance, one edge can be 90 degrees or more and another edge can be less than 90 degrees.

System 400 can include controller 460 that is configured to control a welding parameter related to system 400 in order to adjust an energizing of welding wire 402. In general, the welding parameter can be adjusted by controller 460 based on at least edge detector 450. For instance, edge detector 450 can identify an edge or a non-edge in a "V" shaped groove that is to be filled by welding material from the welding operation. It is to be appreciated that controller 460 can adjust a welding parameter based on identification of at least one of an edge or a non-edge. By way of example and not limitation, the welding parameter can be an energizing of welding wire 402, a de-energizing (e.g., not energizing) of welding wire 402, a wire feed speed, a temperature of a high intensity heat source (e.g., arc, a sub arc, a tungsten inert gas (TIG) arc, a metal inert gas (MIG) arc, a laser, a plasma arc, a metal core, or a flux core), movement speed of a weave motion, among others. It is to be appreciated that controller 460 can adjust one or more welding parameters alone or in combination. For instance, a subset of the welding parameters can be adjusted. Further, controller 460 can adjust a welding parameter in proportion to a location on the edge and/or the non-edge.

Controller 460 can adjust the welding parameter to manage a temperature of the puddle formed by electrode 406. For instance, the temperature can be increased, decreased, maintained, and the like. In an embodiment, controller 460 adjusts one or more welding parameters to manage the temperature of the puddle. In an embodiment, controller 460 adjusts the welding parameter based on an identification of the edge and/or the non-edge via edge detector 450. For instance, a portion of movement from side-to-side during a weave weld can include a location proximate to at least a portion of an edge and a portion of a non-edge. In a particular embodiment, controller 460 can adjust the welding parameter based on the location.

Controller 460 can adjust whether welding wire 402 is energized or not energized via welding wire power source 440. For instance, welding wire 402 can be energized upon detection of the edge. In another instance, welding wire 402 can be de-energized or not energized upon detection of the non-edge. In another embodiment, controller 460 can adjust an amount of energizing welding wire by welding wire power source 440. For example, the amount of energizing of welding wire 402 at an edge can be greater than the amount of energizing of welding wire 402 at a non-edge. It is to be appreciated that energized welding wire 402 fed into the puddle increases the temperature of the puddle and non-energized welding wire 402 fed into the puddle decreases the temperature of the puddle.

In another embodiment, controller 460 can adjust wire feed speed for supply or delivery of welding wire 402 via wire feeder 430. For instance controller 460 can increase the wire feed speed, decrease the wire feed speed, maintain the wire feed speed, and the like. In an embodiment, controller 460 can, via wire feeder 430, increase wire feed speed for welding wire that is energized at an edge (e.g., decreases the temperature of the puddle). In another embodiment, controller 460 can increase wire feed speed for welding wire 402 that is not energized at a non-edge (e.g., decreases the temperature of the puddle). In another embodiment, controller 460 can decrease the wire feed speed of energized welding wire 402 at one of an edge or a non-edge (e.g., increases the temperature of the puddle). In another embodiment, controller 460 can decrease the wire feed speed of de-energized or not energized welding wire 402 at one of an edge or a non-edge (e.g., increases the temperature of the puddle). Take, for instance, the following example. If the puddle is a liquid, it must be hotter than the melting point of the metal. The consumable wire that is being added (e.g., welding wire 402), can be a solid as it hits the puddle or else it would melt and form an arc. The temperature of the energized welding wire 402 can be close to melting but it is still a solid. Because of welding wire 402 is still a solid, the puddle will be cooled or reduced in temperature when welding wire 402 is introduced.

Controller 460 can further adjust a temperature of the high intensity heat source via power source 410. By way of example and not limitation, the high intensity heat source can be an arc, a sub arc, a tungsten inert gas (TIG) arc, a metal inert gas (MIG) arc, a laser, a plasma arc, a metal core, or a flux core. In an embodiment, controller 460 can increase the temperature of the high intensity heat source at an edge to increase a temperature of the puddle. In another embodiment, controller 460 can decrease a temperature of the high intensity heat source at a non-edge to decrease a temperature of the puddle.

Controller 460 can adjust a speed of a weave motion for system 400 in order to manage a temperature of the puddle formed by electrode 406. By way of example, the speed of the weave motion can be increased, decreased, maintained, and the like. In an embodiment, controller 460 can increase a speed of the weave motion to decrease a temperature of the puddle formed by electrode 406. In another embodiment, controller 460 can decrease a speed of the weave motion to increase a temperature of the puddle formed by electrode 406.

It is to be appreciated that although one welding wire 402 and one wire guide 404 are illustrated, system 400 and the subject innovation can include two or more welding wires and respective wire guides. Thus, system 400 can provide independent and/or concurrent control of the two or more welding wires and respective wire guides to adjust welding parameters to manage a temperature of a puddle formed by electrode 406. For instance, for the two or more wires, one or more of respective welding parameters can be adjusted, wherein the welding parameters are, for instance, an energizing of one or more of welding wires, a de-energizing (e.g., not energizing) of one or more of welding wires, a wire feed speed for one or more welding wires, a temperature of a high intensity heat source, movement speed of a weave motion, among others.

It is to be appreciated and understood that system 400 can include various configurations and embodiments and the configuration in system 400 is not to be limiting on the subject innovation. Wire feeder 430 can be a stand-alone component (as depicted), incorporated into edge detector 450, incorporated into welding wire power source 440, incorporated into controller 460, incorporated into position device 470, incorporated into power source 410, incorporated into torch 420, or any suitable combination thereof. Welding wire power source 440 can be a stand-alone component (as depicted), incorporated into controller 460, incorporated into wire feeder 430, incorporated into position device 470, incorporated into power source 410, incorporated into torch 420, incorporated into edge detector 450, or any suitable combination thereof. Edge detector 450 can be a stand-alone component, incorporated into controller 460, incorporated into welding wire power source 440, incorporated into wire feeder 430, incorporated into position device 470 (as depicted), incorporated into power source 410, incorporated into torch 420, or any suitable combination thereof. Position device 470 can be a stand-alone component (as depicted), incorporated into welding wire power source 440, incorporated into wire feeder 430, incorporated into controller 460, incorporated into power source 410, incorporated into torch 420, incorporated into edge detector 450, or any suitable combination thereof. Moreover, it is to be appreciated that welding wire power source 440 and power source 410 can be separate sources (as depicted), shared, a single power source, or a combination thereof. Controller 460 can be a stand-alone component (as depicted), incorporated into edge detector 450, incorporated into welding wire power source 440, incorporated into wire feeder 430, incorporated into position device 470, incorporated into power source 410, incorporated into torch 420, or any suitable combination thereof.

Figure 5:
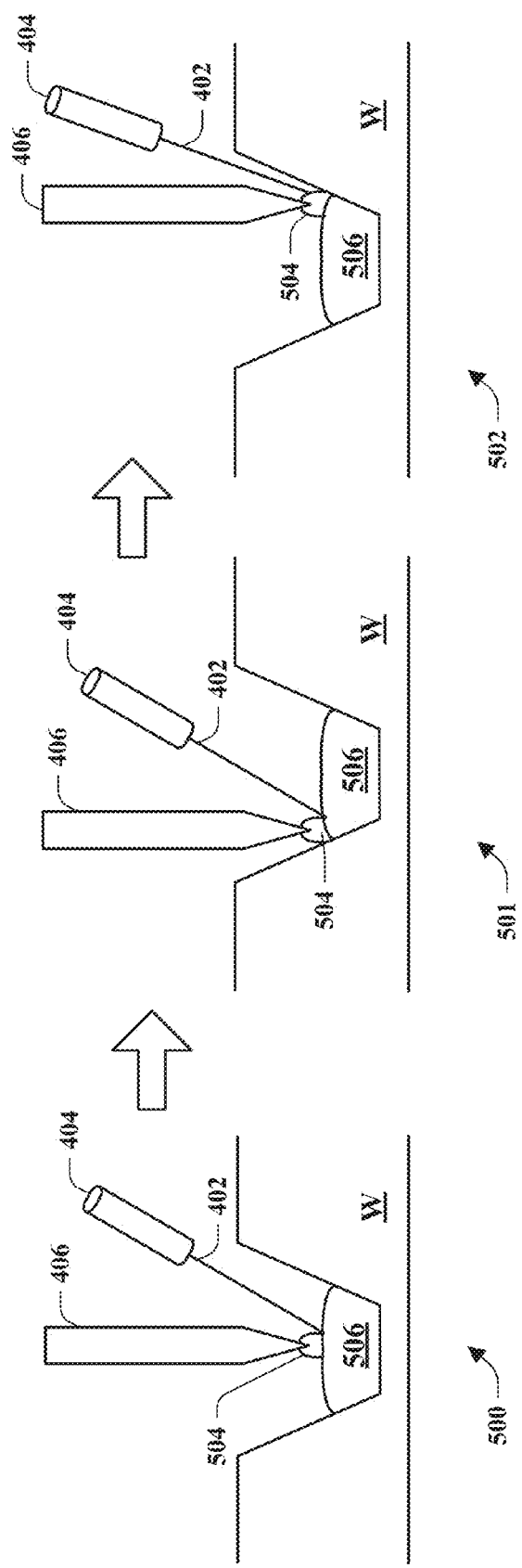
FIG. 5 is a diagram illustrating a welding sequence that performs a weaving weld operation on a "V" groove on a workpiece.

FIG. 5 is illustrates welding sequence shown at 500, 501, and 502 that performs a weaving weld operation on a "V" groove on a workpiece. It is to be appreciated that the location of wire guide 404 and welding wire 402 is depicted solely as an example and is not to be limiting on the subject innovation. For instance, the wire guide 404 and welding wire 402 can be located in a lead and lag in relation to a direction of travel. Welding sequence shown at 500, 501, and 502 are illustrated in a cross-view with a perspective of looking in the direction of travel. Moreover, welding sequences shown at 500, 501, and 502 illustrate a weave weld operation in which a side-to-side motion as the welder moves in the direction of travel to perform the weld (e.g., deposit weld material into the "V" shaped groove on workpice W). It is to be appreciated that the welding sequence can be started or stopped at any position. Welding sequences shown at 500, 501, and 502 are depicted to illustrate a location of an edge and a non-edge. Each welding sequence includes welding wire 402, electrode 406, puddle 506, and arc 504 (e.g., also referred to as high intensity heat source) to perform a welding operation on workpiece W. Welding wire 402, wire guide 404, and electrode 406 can be referred to as welder system.

At 500 depicts the welder system (e.g., welding wire 402, wire guide 404, and electrode 406) at a non-edge. As discussed above, controller 460 (See FIG. 4) can adjust one or more welding parameters based on identification and location at a non-edge. As the welder system moves from side-to-side, the welder system approaches an edge. At 501, the welder system is located at an edge. As discussed above, controller 460 (See FIG. 4) can adjust one or more welding parameters based on identification and location at an edge. At 502, the welder system is located at an opposite side edge (e.g., an edge). As discussed above, controller 460 (See FIG. 4) can adjust one or more welding parameters based on identification and location at an edge. It is to be appreciated that the welding weave motion depicted can go through numerous iterations from side-to-side as the welder system moves in the direction of travel. Thus, the welding sequence shown at 500, 501, and 502 can be iterated.

In an embodiment, the high intensity heat source is at least one of an arc, a sub arc, a tungsten inert gas (TIG) arc, a metal inert gas (MIG) arc, a laser, a plasma arc, a metal core, or a flux core. In an embodiment, the controller activates the welding wire power source at the edge to increase a temperature of the welding wire to increase the temperature of the puddle. In an embodiment, the system can include the edge detector identifying a non-edge on the workpiece; and the controller de-activating the welding wire power source at the non-edge to decrease a temperature of the welding wire to decrease the temperature of the puddle. In an embodiment, the wire feeder decreases a wire feed speed of the welding wire based on the edge identified. In an embodiment, the system can include the edge detector identifying a non-edge on the workpiece; and the wire feeder increasing the wire feed speed of the welding wire based on the non-edge identified.

In an embodiment, the power source increases a temperature of the high intensity heat source based on the edge identified. In an embodiment, the system can include the edge detector identifying a non-edge on the workpiece; and the power source increasing a temperature of the high intensity heat source based on the non-edge identified. In an embodiment, the welding wire power source energizes the welding wire in proportion to an amount of the edge at which the welding torch is located.

In an embodiment, the system can include a position device that identifies a location of the welding torch in relation to the workpiece. In the embodiment, the location of the welding torch in relation to the workpiece is adjusted by movement from at least one of the welding torch, the workpiece, or a weld seamer coupled to the workpiece. In an embodiment, the welding torch provides a weave welding movement. In an embodiment, the welding wire power source energizes the welding wire in proportion to the location of the welding torch in the weave welding movement. In an embodiment, the edge is a "V" shaped groove located on the workpiece at which a welding material is deposited.

Figure 6:
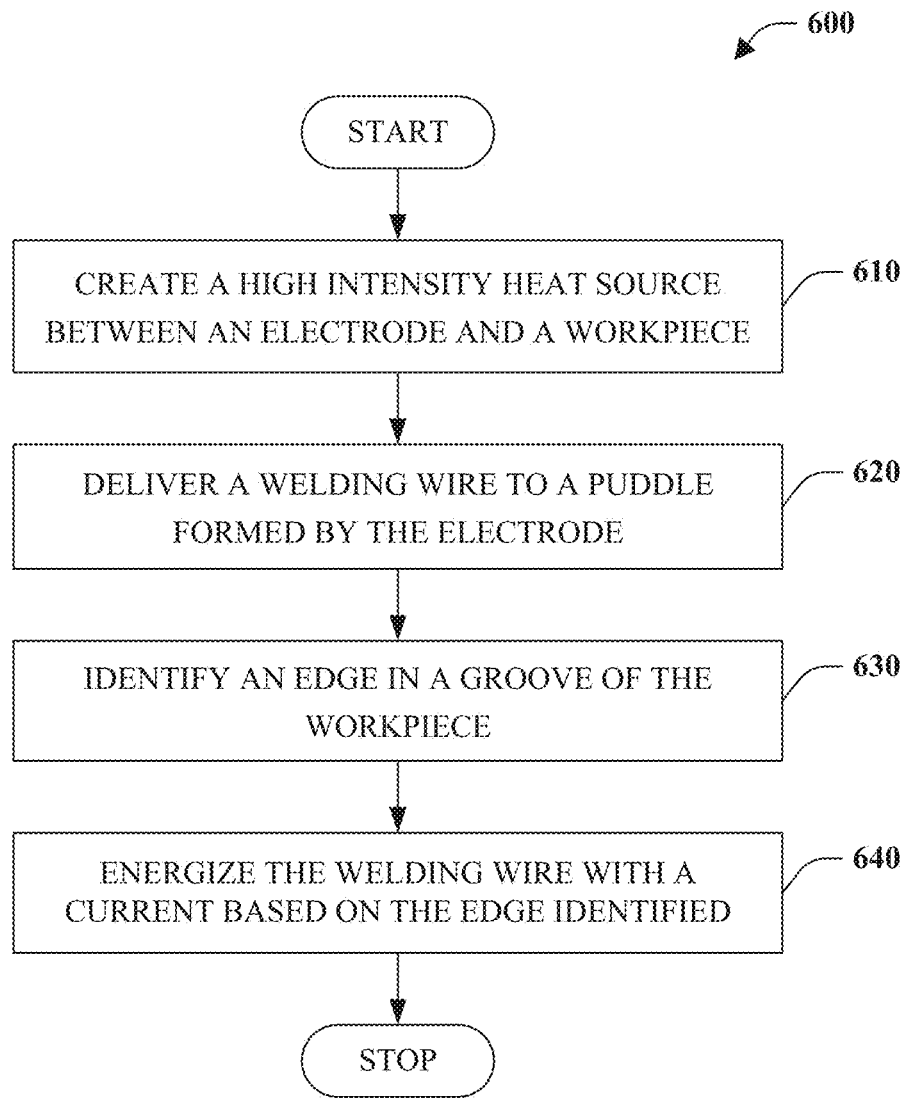
FIG. 6 is a flow diagram of controlling an energizing of a welding wire in a welding operation based on a detection of an edge in a "V" shaped groove on a workpiece.

In view of the exemplary devices and elements described supra, methodologies that may be implemented in accordance with the disclosed subject matter will be better appreciated with reference to the flow charts and/or methodology of FIG. 6. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 600 of FIG. 6 which is a flow diagram 600 that provides control of an energizing of a welding wire in a welding operation based on a detection of an edge in a "V" shaped groove on a workpiece. At reference block 610, a high intensity heat source can be created between an electrode and a workpiece. For instance, the high intensity heat source can be, but is not limited to, an arc, a tungsten inert gas (TIG) arc, a metal inert gas (MIG) arc, a laser, a plasma arc, a metal core, or a flux core. At reference block 620, a welding wire can be delivered to a puddle formed by the electrode. For instance, the welding wire can be delivered by a wire guide, a wire feeder, a combination thereof, among others. At reference block 630, an edge in a groove of the workpiece can be identified. It is to be appreciated that a non-edge can be identified. For instance, a non-edge is a location that a temperature of the puddle is not increased, whereas an edge is a location that a temperature of the puddle is increased. At reference block 640, the welding wire can be energized with a current based on the edge identified. In another embodiment, the welding wire can be not energized with a current based on a non-edge identified.

In an embodiment, the high intensity heat source is at least one of an arc, a sub arc, a tungsten inert gas (TIG) arc, a metal inert gas (MIG) arc, a laser, a plasma arc, a metal core, or a flux core. In an embodiment, the method can include employing a weaving welding motion to deposit welding material into the groove on the workpiece. In an embodiment, the method can include at least one of the following: increasing a temperature of the puddle by injecting the welding wire that is energized; decreasing the temperature of the puddle by injecting the welding wire that is not energized; increasing the temperature of the puddle by increasing a temperature of the high intensity heat source; increasing the temperature of the puddle by increasing a wire feed speed of the welding wire that is energized; and decreasing the temperature of the puddle by increasing the wire feed speed of the welding wire that is not energized. In an embodiment, the method can include controlling at least one of an increase or a decrease of the temperature of the puddle based on the step of identifying the edge.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
    a welding torch that includes an electrode;
    a power source that creates a high intensity heat source between the electrode and a workpiece to create a puddle;
    a wire feeder that is connected to a supply of wire to deliver a wire to the puddle formed by the electrode;
    an edge detector that is configured to identify an edge on the workpiece;
    a hot wire power source that energizes the wire;
    a controller that controls the hot wire power source based on the edge identified by activating the hot wire power source at the edge to increase a temperature of the wire to increase a temperature of the puddle.

2. The welder system of claim 1, wherein the high intensity heat source is at least one of an arc, a sub arc, a tungsten inert gas (TIG) arc, a metal inert gas (MIG) arc, a laser, a plasma arc, a metal core, or a flux core.

3. The welder system of claim 1, further comprising:
    the edge detector identifies a non-edge on the workpiece; and
    the controller de-activates the hot wire power source at the non-edge to decrease a temperature of the wire to decrease the temperature of the puddle.

4. The welder system of claim 1, further comprising the wire feeder decreases a wire feed speed of the wire based on the edge identified.

5. The welder system of claim 1, further comprising:
    the edge detector identifies a non-edge on the workpiece; and
    the wire feeder increases the wire feed speed of the wire based on the non-edge identified.

6. The welder system of claim 1, wherein the power source increases a temperature of the high intensity heat source based on the edge identified.

7. The welder system of claim 1, further comprising:
    the edge detector identifies a non-edge on the workpiece; and
    the power source decreases a temperature of the high intensity heat source based on the non-edge identified.

8. The welder system of claim 1, wherein the hot wire power source energizes the wire in proportion to an amount of the edge at which the welding torch is located.

9. The welder system of claim 1, further comprising a position device that identifies a location of the welding torch in relation to the workpiece.

10. The welder system of claim 9, wherein the location of the welding torch in relation to the workpiece is adjusted by movement from at least one of the welding torch, the workpiece, or a weld seamer coupled to the workpiece.

11. The welder system of claim 9, wherein welding torch provides a weave welding movement with the edge detector signaling the weave welding movement to change directions.

12. The welder system of claim 11, wherein the hot wire power source energizes the wire in proportion to the location of the welding torch in the weave welding movement.

13. The welder system of claim 1, wherein the edge includes at least one or more sidewalls located on the workpiece at which a welding material is deposited.

* * * * *